Patented Sept. 14, 1943

2,329,265

UNITED STATES PATENT OFFICE 2,329,265

CONCENTRATION OF ALIPHATIC ACIDS

Walter Henry Groombridge and Ronald Page, Spondon, near Derby, England, assignors to Celanese Corporation of America, a corporation of Delaware No Drawing. Application February 12, 1941, Serial No. 378,634. In Great Britain March 5, 1940

13 Claims. (Cl. 260—230)

This invention relates to the recovery of lower fatty acids, particularly acetic acid. It is especially concerned with the recovery of such acids, together with cellulose esters, from solutions of cellulose esters in the said acids; e. g. the recovery of cellulose acetate and acetic acid from solutions of cellulose acetate in acetic acid, for example those obtained by the acetylation of cellulose with acetic anhydride in the presence of sulphuric acid. The invention will be described more particularly in relation to the treatment of such solutions.

A common method of isolating cellulose acetate and recovering acetic acid in concentrated form from solutions of cellulose acetate in acetic acid, is to precipitate the cellulose acetate by the action of an aqueous liquid and then, after separating the precipitated cellulose acetate, to extract acetic acid from the residual aqueous liquid by means of a solvent for acetic acid.

It has been found that in such processes the proportion of solvent for acetic acid which need be employed in relation to the amount of acid recovered can be reduced very greatly if the aqueous acid undergoing extraction contains ammonium sulphate and if the extraction of the acetic acid is discontinued when a substantial proportion of the acetic acid still remains in the aqueous liquid.

According to the present invention cellulose acetate is precipitated from a solution thereof in acetic acid by the action of an aqueous solution of ammonium sulphate containing some acetic acid; and, after separating the precipitated cellulose acetate, a part only of the acetic acid is extracted from the aqueous liquid by the action of a solvent for acetic acid, residual aqueous liquid being then used as at least part of a precipitating liquid for the precipitation of further cellulose acetate from an acetic acid solution thereof. The extraction of a part only of the acetic acid content of the aqueous liquid, combined with the presence of the ammonium sulphate, enables the acetic acid of the cellulose acetate solution to be recovered by extraction with a proportion of solvent which is very much less than is the case when these expedients are not employed. At the same time ammonium sulphate content of the liquid, after extraction of acetic acid from the latter, is utilised in a succeeding operation without expensive operations such as concentration of the ammonium sulphate solution or isolation of the ammonium sulphate in solid form.

The ammonium sulphate should be present in substantial proportion, e. g. to the extent of at least 10% based on the weight of water present. It is preferred to use a proportion of 30% or more, e. g. sufficient to saturate the aqueous acetic acid.

As regards the extraction of acetic acid from the aqueous liquid containing acetic acid and ammonium sulphate, this can be carried out so as to leave in the liquid from 10 to 45% of the acid present before extraction.

The new process is of especial value for the isolation of cellulose acetate from acetylation solutions obtained by acetylating cellulose with acetic anhydride in acetic acid in presence of sulphuric acid. When applying the process to such solutions (which may have been "ripened") the sulphuric acid content is converted to ammonium sulphate by the action of ammonia or ammonium acetate which can be added directly to the cellulose acetate solution or included in the precipitation liquid. By using ammonia or ammonium acetate for destruction of the sulphuric acid the formation can be avoided of salts other than ammonium sulphate, or of acids other than acetic acid, in the liquid to be extracted or that to be used for precipitation of cellulose acetate.

When cellulose acetate solutions containing sulphuric acid are treated as described above the quantity of ammonium sulphate present will increase with each cycle of operations, unless a suitable proportion is removed from time to time and preferably at each cycle. Most conveniently, after extraction of part of the acetic acid, a suitable portion of the residual ammonium sulphate solution containing some acetic acid is treated for recovery of acetic acid and ammonia. The acetic acid is conveniently recovered by extraction with a solvent and the ammonia by distillation of the residual liquid with lime or other alkali. The recovered ammonia is then available for combining with the sulphuric acid of a cellulose acetate solution containing this acid, as described above. Usually it is convenient to mix it with the main body of ammonium sulphate solution, containing acetic acid, to be used for the precipitation of the cellulose acetate.

The ammonium sulphate solution from which part only of the acetic acid has been extracted is advantageously used to wash precipitated cellulose acetate. This washing of the cellulose acetate is conveniently effected in countercurrent, that is to say the ammonium sulphate solution is used to wash successive portions of cellulose acetate of progressively increasing acetic acid content. The acetic acid content of the ammonium sulphate solution is thereby increased and it is thereafter used to precipitate cellulose acetate. The precipitated cellulose acetate, after the washing with ammonium sulphate solution, is washed with water, the washings being mixed with the ammonium sulphate solution before the latter is used for washing cellulose acetate as mentioned above. Some water is thereby introduced at each cycle of operations and can be arranged to compensate for that removed, as described above, in the form of ammonium sulphate solution for recovery of ammonia.

Various solvents may be used for the extraction. They should preferably be such as do not dissolve in, or take up water from, aqueous ammonium sulphate solutions to a very substantial extent. Their boiling points may be above or below that of the acetic acid to be extracted. Further their boiling points should preferably differ from that of the acetic acid by so much that they can be readily separated from the acid by a distillation operation. They may consist of single chemical compounds or mixtures of compounds.

Examples of solvents suitable for the extraction of acetic acid and having a boiling point below that of acetic acid are diethyl ether, dipropyl ether, di-isopropyl ether, ethyl acetate and similar volatile esters of acetic acid, methylene chloride and ethylene chloride. Particular mention may be made of the mixtures of solvents for acetic acid with hydrocarbons, mentioned in U. S. Patent No. 1,696,432. A suitable mixture is that of diethyl ether with petroleum ether or ethyl acetate with benzene, e. g. a mixture of 4 parts by volume of ethyl acetate with 6 parts by volume of benzene.

An example of a suitable solvent having a boiling point above that of acetic acid is amyl acetate.

The extraction with the solvent is advantageously effected systematically, a given body of solvent being used to extract successively a series of acid solutions of progressively increasing concentration. Batch methods may be used, extraction being then conveniently effected in a series of vessels and the extract and extracted liquor being transferred from vessel to vessel, the extract for extraction of further acid of higher concentration than that just extracted, and the extracted liquor for extraction by solvent containing a smaller proportion of acid than that just used for extraction.

Again, continuous counterflow extraction may be used, the solvent being run in counter-current to the aqueous liquor. The apparatus may then conveniently take the form of a column, through which the aqueous acid and solvent are passed in counterflow, whichever has the lower specific gravity being introduced at the lower part of the column. The liquids are advantageously introduced into the column in a series of fine streams so as to provide a large surface of contact between the liquids. Further the column may be provided with suitable packing material to the same end.

Isolation of concentrated acid from the extract can be effected by distillation. The extract can be distilled in batches or continuous stills can be used. The recovered solvent can of course be returned to the extraction apparatus. When the solvents used as extractants form with water azeotropic mixtures of minimum boiling point, water extracted with the acid to be concentrated can be removed to a substantial degree during the distillation, in the form of such a mixture, together with the solvent, thereby facilitating the production of a highly concentrated or even substantially anhydrous acid.

The process of the invention can also be applied to the isolation of cellulose esters from solutions generally of cellulose esters in lower fatty acids and particularly solutions which have been prepared by esterification of cellulose in presence of a lower fatty acid, for example a solution of cellulose propionate in propionic acid.

Further, in place of ammonium sulphate other ammonium salts can be employed, though in general less advantageously and particularly so where an esterification solution prepared with the aid of sulphuric acid as catalyst is being treated.

The foregoing modifications are included in the scope of the application which also includes broadly the extraction, by means of a solvent, of acetic or other lower fatty acid from an aqueous solution thereof containing ammonium sulphate or other ammonium salt in substantial proportion.

Having described our invention, what we desire to secure by Letters Patent is:

1. Process for the recovery of cellulose acetate and acetic acid from a solution of cellulose acetate in acetic acid, which comprises precipitating the cellulose acetate from the solution by the action of an aqueous solution of ammonium sulphate containing some acetic acid, separating the precipitated cellulose acetate, extracting a part only of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

2. Process for the recovery of a lower fatty acid and a cellulose ester of a lower fatty acid from a solution of the said ester in the lower fatty acid, which comprises precipitating the cellulose ester from the solution by the action of an aqueous solution of ammonium sulphate containing some of the lower fatty acid, separating the precipitated ester, extracting a part only of the lower fatty acid from the aqueous liquid by the action of a solvent therefor which is substantially immiscible with water, removing the solvent from the extract, and using the residual aqueous liquid as at least part of an aqueous liquid for the precipitation of further cellulose ester from a solution thereof in the lower fatty acid.

3. Process for the recovery of a lower fatty acid and a cellulose ester of a lower fatty acid from an esterification solution of the said ester made by esterification of cellulose with a lower fatty acid anhydride in a lower fatty acid using sulphuric acid as catalyst, which comprises precipitating the cellulose ester from the solution by the action of an aqueous solution of ammonium sulphate containing some of the lower fatty acid and sufficient of an ammonium salt of the lower fatty acid to convert the sulphuric acid present into ammonium sulphate, separating the precipitated ester, extracting a part only of the lower fatty acid from the aqueous liquid by the action of a solvent therefor which is substantially immiscible with water, removing the solvent from the extract, and using the residual aqueous liquid as at least part of an aqueous liquid for the precipitation of further cellulose ester from a solution thereof in the lower fatty acid.

4. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid, separating the precipitated cellulose acetate, extracting a part only of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

5. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid and sufficient ammonium acetate to convert the sulphuric acid present into ammonium sulphate, separating the precipitated cellulose acetate, extracting a part only of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

6. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid and sufficient ammonium acetate to convert the sulphuric acid present into ammonium sulphate, the amount of ammonium sulphate and ammonium acetate being such that the resultant aqueous liquid contains at least 10% of ammonium sulphate based on the weight of water present, separating the precipitated cellulose acetate, extracting a part only of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

7. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid and sufficient ammonium acetate to convert the sulphuric acid present into ammonium sulphate, the amount of ammonium sulphate and ammonium acetate being such that the resultant aqueous liquid is substantially saturated with ammonium sulphate, separating the precipitated cellulose acetate, extracting a part only of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

8. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid and sufficient ammonium acetate to convert the sulphuric acid present into ammonium sulphate, the amount of ammonium sulphate and ammonium acetate being such that the resultant aqueous liquid contains at least 10% of ammonium sulphate based on the weight of water, extracting from 55 to 90% of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

9. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid and sufficient ammonium acetate to convert the sulphuric acid present into ammonium sulphate, the amount of ammonium sulphate and ammonium acetate being such that the resultant aqueous liquid is substantially saturated with ammonium sulphate, separating the precipitated cellulose acetate, extracting from 55 to 90% of the acetic acid from the aqueous liquid by the action of a solvent for acetic acid which is substantially immiscible with water, removing the solvent from the extract, and using the residual aqueous liquid as at least part of an aqueous liquid for the precipitation of further cellulose acetate from an acetic acid solution thereof.

10. Process for the recovery of cellulose acetate and acetic acid from an acetylation solution made by acetylating cellulose with acetic anhydride in acetic acid using sulphuric acid as catalyst, which comprises precipitating the cellulose acetate from the solution by the action of an aqueous solution of ammonium sulphate containing some acetic acid and sufficient ammonium acetate to convert the sulphuric acid present into ammonium sulphate, the amount of ammonium sulphate and ammonium acetate being such that the resultant aqueous liquid contains at least 10% of ammonium sulphate based on the weight of water present, separating the precipitated cellulose acetate, extracting from 55 to 90% of the acetic acid from the aqueous liquid by the action of a mixture of benzene and ethyl acetate, removing the benzene and ethyl acetate from the extract, and using the residual aqueous liquid as at least part of an aqueous liquid for the precipitation of further cellulose acetate from an acetic acid solution thereof.

11. Process for the recovery of cellulose acetate and acetic acid from an acetylation solution made by acetylating cellulose with acetic anhydride in acetic acid using sulphuric acid as catalyst which comprises precipitating the cellulose acetate from the solution by the action of an aqueous solution of ammonium sulphate containing some acetic acid and sufficient ammonium acetate to convert the sulphuric acid present into ammonium sulphate, the amount of ammonium sulphate and ammonium acetate being such that the resultant aqueous liquid is substantially saturated with ammonium sulphate, separating the precipitated cellulose acetate, extracting from 55 to 90% of the acetic acid from the aqueous liquid by the action of a mixture of benzene and ethyl acetate, removing the benzene and ethyl acetate from the extract, and using the residual aqueous liquid for the precipitation of further cellulose acetate from an acetic acid solution thereof.

12. Process for the extraction of acetic acid from aqueous solutions thereof, which comprises forming at least 10% of ammonium sulfate, based on the weight of the water present, in said aqueous solution of acetic acid and extracting the solution with a solvent for acetic acid which is substantially immiscible with water, sufficient solvent being employed to extract 55 to 90% of the acetic acid present, and then removing the solvent from the extract.

13. Process for the extraction of acetic acid from aqueous solutions thereof, which comprises forming sufficient ammonium sulfate in said aqueous solution of acetic acid to substantially saturate said aqueous solution and extracting the solution with a solvent for acetic acid which is substantially immiscible with water, sufficient solvent being employed to extract 55 to 90% of the acetic acid present, and then removing the solvent from the extract.

WALTER HENRY GROOMBRIDGE.
RONALD PAGE.